United States Patent
Base et al.

(10) Patent No.: US 11,248,681 B2
(45) Date of Patent: Feb. 15, 2022

(54) EPICYCLIC GEAR SYSTEM HAVING TORSIONAL FUSE, TORSIONAL FUSE IN DRIVETRAIN SYSTEM, AND METHOD OF OPERATING DRIVETRAIN SYSTEM

(71) Applicant: DEERE & COMPANY, Moline, IL (US)

(72) Inventors: Douglas S. Base, Coffeyville, KS (US); Steven R. Fliearman, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 112 days.

(21) Appl. No.: 16/668,546

(22) Filed: Oct. 30, 2019

(65) Prior Publication Data

US 2021/0131528 A1 May 6, 2021

(51) Int. Cl.
| | |
|---|---|
| *F16H 35/10* | (2006.01) |
| *F16H 1/28* | (2006.01) |
| *F16H 57/04* | (2010.01) |
| *F16H 1/32* | (2006.01) |

(52) U.S. Cl.
CPC ........... *F16H 1/2809* (2013.01); *F16H 35/10* (2013.01); *F16H 57/042* (2013.01); *F16H 2001/327* (2013.01)

(58) Field of Classification Search
CPC ...... F16H 1/2809; F16H 57/042; F16H 35/10; F16H 2001/327
See application file for complete search history.

(56) References Cited

U.S. PATENT DOCUMENTS

| | | | | | |
|---|---|---|---|---|---|
| 4,282,776 | A | * | 8/1981 | Eller | F16H 1/28 475/149 |
| 5,071,397 | A | * | 12/1991 | Grimm | B64C 13/341 475/263 |
| 5,542,505 | A | | 8/1996 | Kempf | |
| 5,690,577 | A | * | 11/1997 | Enzmann | B25B 23/14 384/571 |

FOREIGN PATENT DOCUMENTS

| | | | | |
|---|---|---|---|---|
| CN | 102996676 A | | 3/2013 | |
| GB | 2142404 A | * | 1/1985 | ............. F16H 35/10 |
| WO | 2014114679 A1 | | 7/2014 | |

\* cited by examiner

*Primary Examiner* — Justin Holmes

(57) ABSTRACT

A torsional fuse in a drivetrain system, an epicyclic gear system, and a method of operating a drivetrain system are provided. The epicyclic gear system includes a housing, a shaft configured to rotate relative to the housing, a sun gear being disposed concentric to the shaft, a plurality of planet gears disposed around the sun gear, a ring gear disposed around the plurality of planet gears, a carrier connecting the plurality of planet gears, and a torsional fuse defined by an interface between a first torsional fuse portion and a second torsional fuse portion, the torsional fuse being configured to allow rotation between the first torsional fuse portion and the second torsional fuse portion upon application of a threshold torque at the torsional fuse.

25 Claims, 4 Drawing Sheets

EPICYCLIC GEAR SYSTEM HAVING TORSIONAL FUSE, TORSIONAL FUSE IN DRIVETRAIN SYSTEM, AND METHOD OF OPERATING DRIVETRAIN SYSTEM

BACKGROUND

Drivetrain systems may include epicyclic or other torque-transferring systems. As one non-limiting example, epicyclic gear systems include a sun gear that is centrally located on a central shaft. The sun gear is in meshed engagement with a plurality of planetary or planet gears, and the planet gears are in meshed engagement with an outer ring gear. The planet gears are rotatably mounted on a carrier that may rotate relative to the sun gear. A second shaft may be coupled to the carrier to receive torque from or supply torque to the epicyclic gear system. A speed and torque difference may be realized between the central shaft and the second shaft. One or more of the components of the epicyclic gear system may receive a torque of varying magnitude during operation of the epicyclic gear system. Similarly, one or more components of a similar gear system or other drivetrain system may receive torque of varying magnitudes, include extreme torque values, during operation of the drivetrain system.

SUMMARY

Various aspects of embodiments of the present disclosure are set out in the claims.

In an embodiment of the present disclosure, an epicyclic gear system includes a housing, a shaft configured to rotate relative to the housing, a sun gear being disposed concentric to the shaft, a plurality of planet gears disposed around the sun gear, a ring gear disposed around the plurality of planet gears, a carrier connecting the plurality of planet gears, and a torsional fuse defined by an interface between a first torsional fuse portion and a second torsional fuse portion, the torsional fuse being configured to allow rotation between the first torsional fuse portion and the second torsional fuse portion upon application of a threshold torque at the torsional fuse.

In an embodiment of the present disclosure, a torsional fuse in a drivetrain system includes a first torsional fuse portion having a first diameter, a second torsional fuse portion having a second diameter different from the first diameter of the first torsional fuse portion, the first torsional fuse portion being press fit with the second torsional fuse portion due to the difference between the first diameter of the first torsional fuse portion and the second diameter of the second torsional fuse portion, and an interface between the first torsional fuse portion and the second torsional fuse portion configured to allow relative rotation between the first torsional fuse portion and the second torsional fuse portion upon application of a threshold torque at the torsional fuse, the threshold torque being correlated with the difference between the first diameter of the first torsional fuse portion and the second diameter of the second torsional fuse portion.

The first torsional fuse portion may be fixed to the shaft, and the second torsional fuse portion may be fixed to the ring gear. The first torsional fuse portion may include a radially extending member such that the torsional fuse is disposed between the radially extending member and the ring gear. The second torsional fuse portion may include a radially extending member such that the torsional fuse is disposed between the radially extending member and the shaft. The first torsional fuse portion may be fixed to the ring gear, and the second torsional fuse portion may be fixed to the housing. The first torsional fuse portion may be fixed to the sun gear, and the second torsional fuse portion may be fixed to a second shaft fixed to the housing. The interface may include a plurality of recesses extending axially in at least one of the first torsional fuse portion and the second torsional fuse portion. The first torsional fuse portion may include a first diameter, and the second torsional fuse portion may include a second diameter such that the first torsional fuse portion is press fit with the second torsional fuse portion due to a difference between the first diameter and the second diameter. The threshold torque may be correlated to the difference between the first diameter and the second diameter. The system or fuse may further include a retainer configured to limit axial movement between the first torsional fuse portion and the second torsional fuse portion. The system or fuse may further include a plurality of recesses in at least one of the first torsional fuse portion and the second torsional fuse portion. The plurality of recesses may extend axially in the at least one of the first torsional fuse portion and the second torsional fuse portion. The first torsional fuse portion may be fixed to a shaft of the drivetrain system, and the second torsional fuse portion may be fixed to the ring gear of the drivetrain system. The first torsional fuse portion may be fixed to a ring gear of the drivetrain system, and the second torsional fuse portion may be fixed to a housing of the drivetrain system. The first torsional fuse portion may be fixed to a sun gear of the drivetrain system, and the second torsional fuse portion may be fixed to a shaft fixed to a housing of the drivetrain system.

In an embodiment of the present disclosure, a method of operating a drivetrain system having a torsional fuse defined by an interface between a first torsional fuse portion press fit with a second torsional fuse portion is provided. The method includes receiving a torque through the interface and rotating one of the first torsional fuse portion and the second torsional fuse portion relative to the other of the first torsional fuse portion and the second torsional fuse portion upon receiving a threshold torque at the torsional fuse.

The method may include limiting axial movement between the first torsional fuse portion and the second torsional fuses portion with a retainer at the interface. The method may include transferring material from the interface to one of a plurality of recesses in at least one of the first torsional fuse portion and the second torsional fuse portion upon rotating the one of the first torsional fuse portion and the second torsional fuse portion relative to the other of the first torsional fuse portion and the second torsional fuse portion.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 4 of the drawings.

Figure 1:
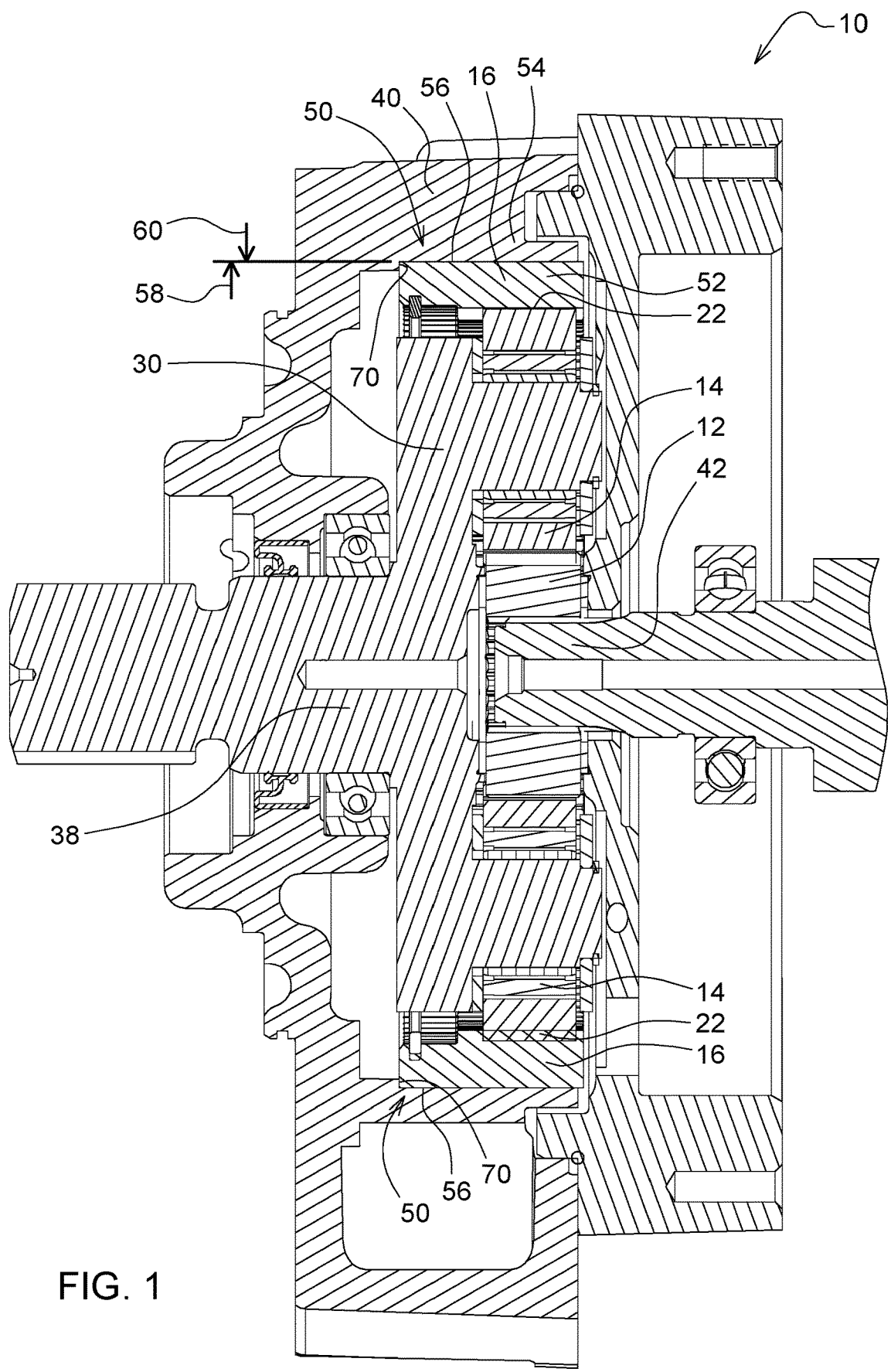
FIG. 1 is a cross-sectional view of a drivetrain system in accordance with an embodiment of the present disclosure.
Figure 2:
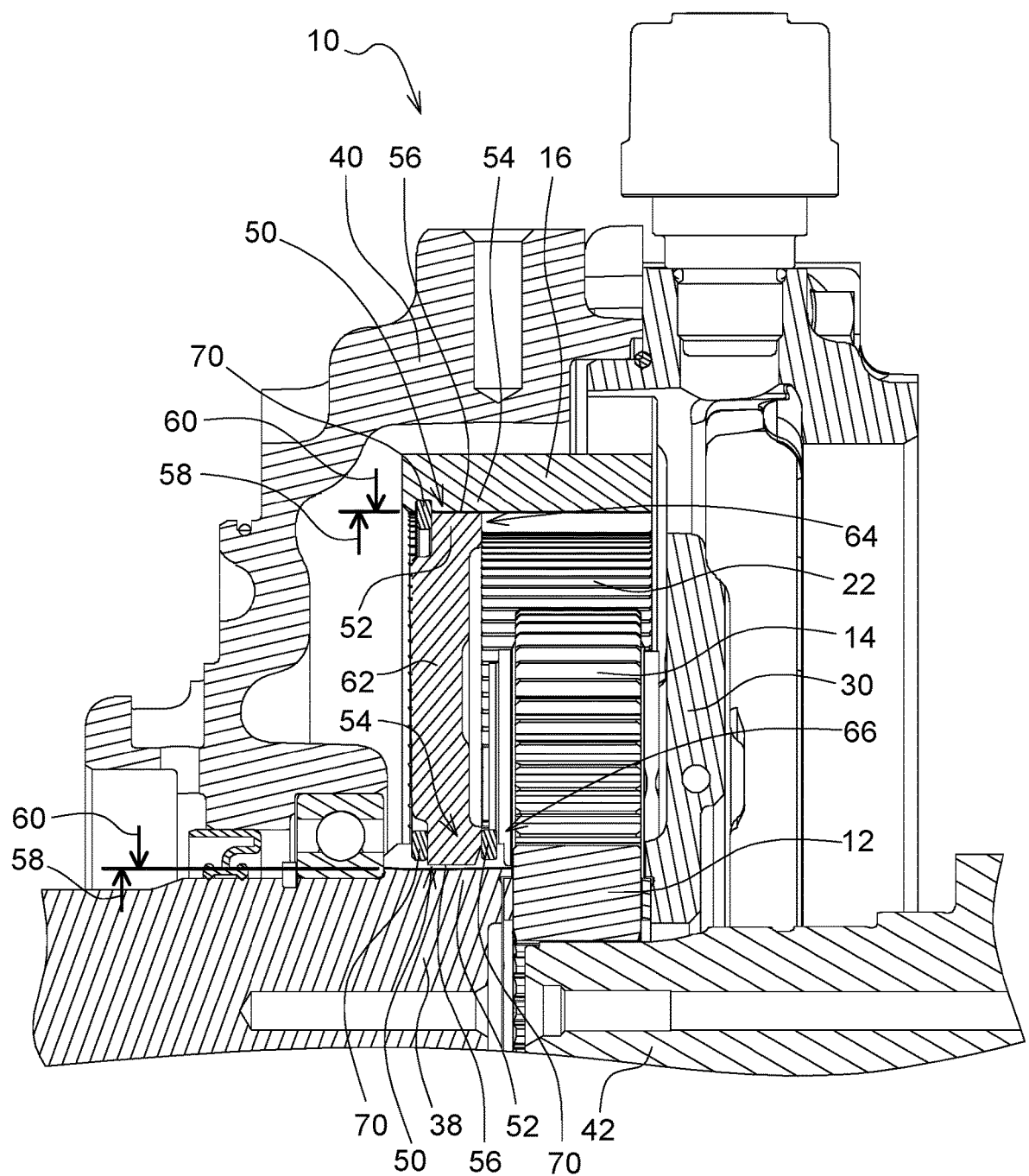
FIG. 2 is a cross-sectional view of a drivetrain system in accordance with an embodiment of the present disclosure.
Figure 3:
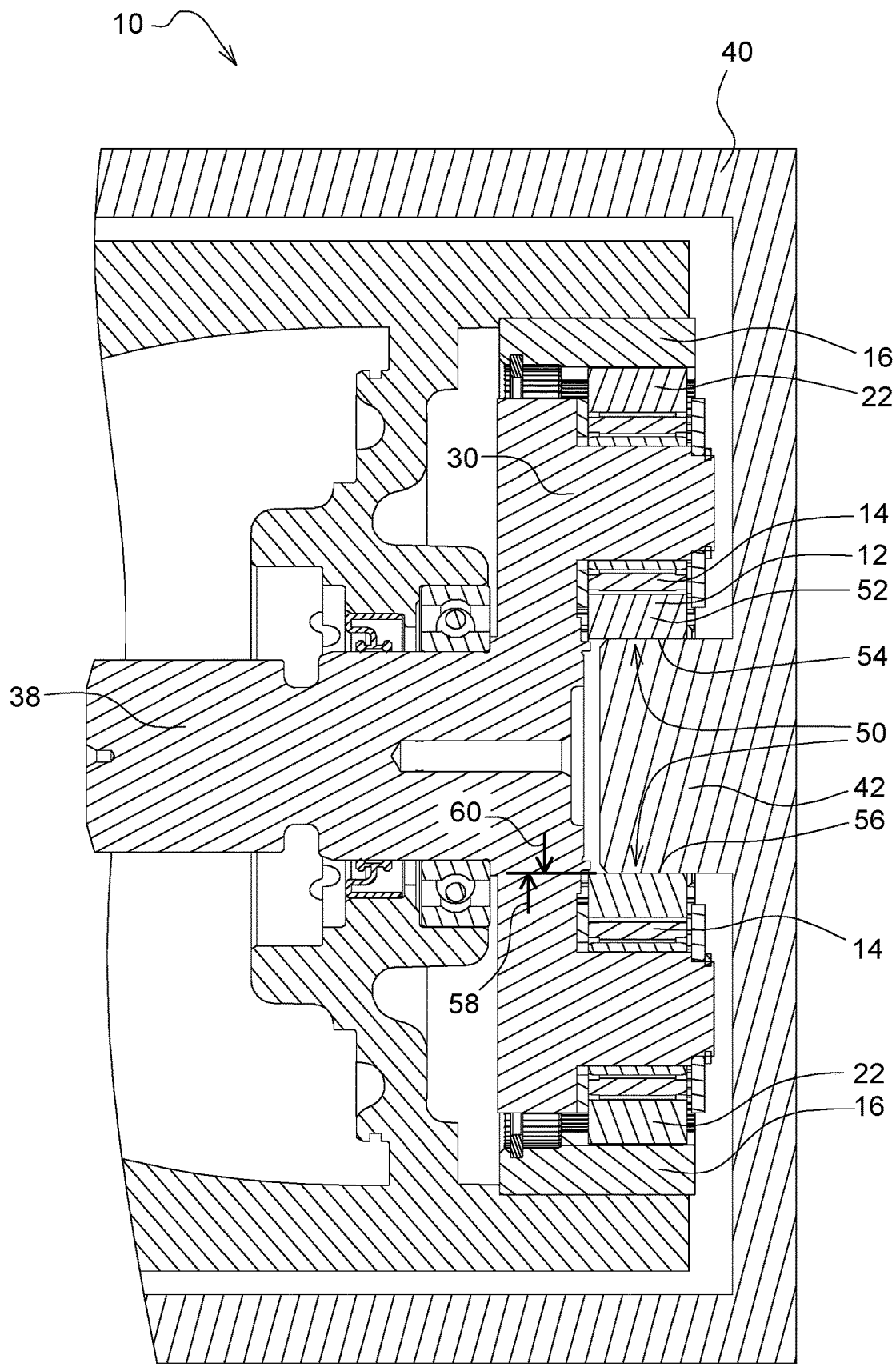
FIG. 3 is a cross-sectional view of a drivetrain system in accordance with an embodiment of the present disclosure.

Referring now to FIGS. 1-3, a drivetrain system and, in particular, an epicyclic gear system 10 is illustrated in accordance with various embodiments of the present disclosure. Although the system 10 is illustrated as an epicyclic gear system in the illustrated embodiments, the system 10 of embodiments not illustrated includes any transmission, final drive assembly, gearbox, transfer case, or other component, system, or assembly configured to receive, supply, or transfer torque. The system 10 of FIGS. 1-3 includes a sun gear 12 and a plurality of planetary or planet gears 14 disposed around the sun gear 12. The sun gear 12 engages the planet gears 14 via sun gear teeth and planet gear teeth. The system 10 of the illustrated embodiments includes a ring gear 16 that is disposed around the planet gears 14 and the sun gear 12 and engages the planet gears 14 via ring gear teeth 22. The system 10 further includes a carrier 30 connecting the planet gears 14. The system 10 further includes a housing 40 that is grounded or fixed from movement with, in non-limiting examples not illustrated, a vehicle, a building structure, or another external structure. The system 10 further includes a shaft 38 that is configured to rotate relative to the housing 40. It will be appreciated that the shaft 38 of the embodiments illustrated may be an input shaft or an output shaft and may receive torque from other components of the system 10 or supply torque to other components of the system 10. The sun gear 12 is concentric to the shaft 38 in the illustrated embodiments. As will be explained in further detail below with regard to each embodiment illustrated, the system 10 further includes a torsional fuse 50 configured to allow rotation between a first torsional fuse portion 52 and a second torsional fuse portion 54 upon application or receipt of, reaching, or exceeding a threshold torque at or through the torsional fuse 50.

Referring specifically to the embodiment of FIG. 1, the illustrated carrier 30 is configured to rotate relative to the housing 40. A second shaft 42 is fixed for rotation with the sun gear 12 relative to the housing 40. In the embodiment of FIG. 1, the system 10 is generally configured such that torque is transmitted between the shaft 38 and the second shaft 42. The system 10 of FIG. 1 further includes the torsional fuse 50 disposed at or between the ring gear 16 and the housing 40. An interface 56 of the torsional fuse 50 is formed between the first torsional fuse portion 52, disposed at an outer surface of the ring gear 16, and the second torsional fuse portion 54, disposed at an inner surface of the housing 40 in the embodiment illustrated in FIG. 1. In at least one embodiment, the torsional fuse 50 is configured to allow rotation between the first torsional fuse portion 52 and the second torsional fuse portion 54 upon application or receipt of, reaching, or exceeding the threshold torque at or through the interface 56.

Upon application or receipt of, reaching, or exceeding a threshold torque through the torsional fuse 50, the torsional fuse 50 allows or is configured to allow rotation between the first torsional fuse portion 52 and the second torsional fuse portion 54. In other words, once a threshold torque is reached or exceeded, either the first torsional fuse portion 52 or the second torsional fuse portion 54 rotates relative to the other to absorb the elevated torque. Such threshold or elevated torque values may be the result of a brief, but elevated or extreme torque event due to motor or engine input surges, vehicle or other outer system impacts or inputs, or other unexpected or undesirable torque events.

The first torsional fuse portion 52 includes a first diameter 58, and the second torsional fuse portion 54 includes a second diameter 60. In the embodiment of FIG. 1, the first diameter 58 at the ring gear 16 is greater than the second diameter 60 at the housing 40 such that the first torsional fuse portion 52 is press fit or interference fit with the second torsional fuse portion 54. Further, in particular embodiments, the difference between the first diameter 58 and the second diameter 60 of the torsional fuse 50 determines, is associated with, or correlates to the threshold torque such that, when the threshold torque is reached or exceeded, the first torsional fuse portion 52 rotates relative to the second torsional fuse portion 54 or the system 10 or the torsional fuse 50 allows rotation between the first torsional fuse portion 52 and the second torsional fuse portion 54. To illustrated, during such events in the system 10 of FIG. 1, the ring gear 16 will rotate relative to the housing 40 at the interface 56 to absorb, convert into motion, or otherwise receive torque during such events. Regarding the correlation between the difference in diameters 58, 60 and the threshold torque, in other words, in the embodiment illustrated in FIG. 1, the threshold torque may be increased by increasing the first diameter 58 and/or decreasing the second diameter 60, thereby increasing the difference between the first diameter 58 and the second diameter 60. Similarly, the threshold torque may be decreased by decreasing the first diameter 58 and/or increasing the second diameter 60, thereby decreasing the difference between the first diameter 58 and the second diameter 60. In further embodiments, the area of contact of the interface 56 and/or other structural features may determine, be associated with, or correlate to the threshold torque.

FIG. 2 illustrates an embodiment of the system 10 where the carrier 30 is fixed from movement to the housing 40, and the ring gear 16 rotates or is configured to rotate with the shaft 38 relative to the housing 40. The second shaft 42 also rotates relative to the housing 40 in the embodiment of FIG. 2. In the illustrated embodiment, the first torsional fuse portion 52 is fixed directly or indirectly to the shaft 38, and the second torsional fuse portion 54 is fixed directly or indirectly to the ring gear 16. The system 10 of FIG. 2 includes a radially extending member 62 disposed between the shaft 38 and the ring gear 16.

In a first embodiment of FIG. 2, the torsional fuse 50 is disposed at a radially outer end 64 of the radially extending member 62 such that the first torsional fuse portion 52 is disposed at or includes the radially extending member 62, and the second torsional fuse portion 54 is disposed at or includes the ring gear 16. Accordingly, in the first embodiment of FIG. 2, the torsional fuse 50 is disposed at or between the radially extending member 62 and the ring gear 16.

In a second embodiment of FIG. 2, the torsional fuse 50 is disposed at a radially inner end 66 of the radially extending member 62 such that the second torsional fuse portion 54 is disposed at or includes the radially extending member 62, and the first torsional fuse portion 52 is disposed at or includes the shaft 38. Accordingly, in the second embodiment of FIG. 2, the torsional fuse 50 is disposed at or between the radially extending member 62 and the shaft 38. It will be appreciated that, in additional embodiments not illustrated, multiple torsional fuses 50 may be included at both the radially inner end 66 and the radially outer end 64 and/or at any location therebetween. The radially extending member 62 may be rotationally fixed to the shaft 38 or the ring gear 16 by splines or other coupling means where not coupled with the torsional fuse 50.

FIG. 3 illustrates an embodiment of the system 10 where the carrier 30 is fixed to rotate with the shaft 38, and the sun gear 12 is not configured to rotate on the second shaft 42, which is stationary or fixed from movement in the embodiment, but is configured to be generally fixed from movement with the housing 40. Accordingly, torque is transferred between the ring gear 16 and the shaft 38 through the carrier 30. In the embodiment illustrated in FIG. 3, the torsional fuse 50 is disposed at an inner diameter of the sun gear 12 and an outer diameter of the second shaft 42. The first torsional fuse portion 52 is fixed to or includes the sun gear 12, and the second torsional fuse portion 54 is fixed to or includes the second shaft 42 fixed to the housing 40.

It will be appreciated that, in additional embodiments not illustrated, the torsional fuse 50 may be formed between other components of the system 10 or within the same component of the system 10. Similarly, the first torsional fuse portion 52 and the second torsional fuse portion 54 may be provided in the system 10 as separate or distinct components of the system 10 rather than as being integrally formed with components, such as the ring gear 16, shaft 38, or sun gear 12 in the illustrated embodiments.

Figure 4:
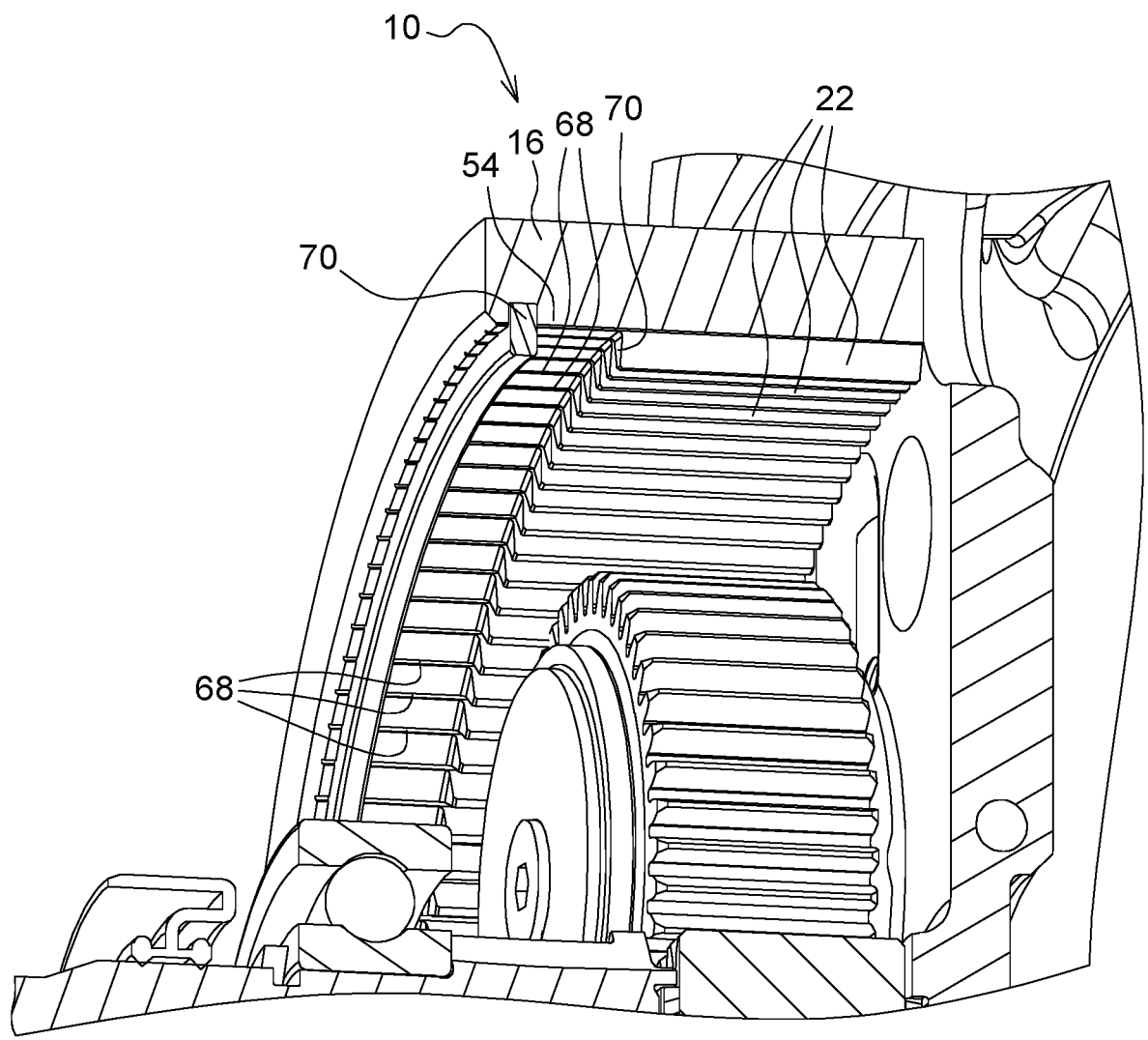
FIG. 4 is a cross-sectional view of a drivetrain system in accordance with an embodiment of the present disclosure.

Reference is now made to FIG. 4, which illustrates an embodiment of the system 10 whereby the interface 56 includes recesses 68 in the first torsional fuse portion 52 and/or the second torsional fuse portion 54. Although the inner, first torsional fuse portion 52 is not illustrated in FIG. 4, the recesses 68 may be similarly disposed as with the second torsional fuse portion 54 shown. The recesses 68 extend axially in the first torsional fuse portion 52 and the second torsional fuse portion 54 in an embodiment but may instead or also extend at least partially circumferentially in additional embodiments not shown. Further, the recesses 68 of embodiments not illustrated may not be linear recesses, but may form round, scalloped, or other shapes in accordance with a desired performance of the recesses 68, as discussed in further detail below.

When a threshold torque is reached or exceeded in the system 10, galling may occur where material from the surface of the interface 56 may be transferred or removed upon relative rotation between the first torsional fuse portion 52 and the second torsional fuse portion 54. The recesses 68 are configured such that material is transferred from the interface 56 to the recesses 68. Further, the recesses 68 receive or are configured to receive oil or other lubricant therethrough to provide lubrication to the surfaces of the interface 56. Still further, the oil or other lubricant supplied to the recesses 68 acts to remove the material from the recesses 68 in additional embodiments. Such removal or transfer of the material and supply of lubricant via the recesses 68 improves control over the threshold torque during operation of the system 10 and prevents, for example, an increasing threshold torque following one or multiple elevated torque events. As such, the recesses 68 allow the threshold torque to remain consistent through repeating elevated torque events.

The embodiment illustrated in FIG. 4 is illustrated in connection with the first embodiment of FIG. 2. However, it will be appreciated that the recesses 68 are included in additional embodiments in connection with any other torsional fuse 50 of embodiments described in the present disclosure.

Referring again to FIG. 4, the system 10 of any embodiment described herein includes a retainer 70 limiting or being configured to limit axial movement between the first torsional fuse portion 52 and the second torsional fuse portion 54 at the interface 56. As shown in FIG. 4, the retainer 70 is a snap ring or other separate structure positioned in a slot of the first torsional fuse portion 52 and/or the second torsional fuse portion 54. Further, the retainer 70 may be formed integrally with the first torsional fuse portion 52 and/or the second torsional fuse portion 54 and/or another structure of the system 10 to limit axial movement of the first torsional fuse portion 52 and/or the second torsional fuse portion 54. As shown in FIG. 4, the retainer 70 may also be formed by the ring gear teeth 22. When a threshold torque is reached or exceeded in the system 10, the retainer(s) 70 prevent, minimize, or otherwise limit or are configured to limit axial movement between the first torsional fuse portion 52 and the second torsional fuse portion 54 at the interface 56 as the first torsional fuse portion 52 and the second torsional fuse portion 54 rotate relative to each other.

In accordance with a further embodiment and aspect of the present disclosure, a method of operating the drivetrain system is provided. The system 10 includes the torsional fuse 50 defined by the interface 56 between the first torsional fuse portion 52 press fit with the second torsional fuse portion 54. The method includes the steps of receiving a torque through the interface 56, such as described in various embodiments of the present disclosure. The method further includes rotating or allowing rotation of the first torsional fuse portion 52 or the second torsional fuse portion 54 relative to the other upon application or receipt of, reaching, or exceeding a threshold torque at the torsional fuse 50. In additional embodiments, the method includes limiting axial movement between the first torsional fuse portion 52 and the second torsional fuses portion 54 with the retainer 70 at the interface 56. In additional embodiments, the method further includes transferring material from the interface 56 to one or more of the recesses 68 in the first torsional fuse portion 52 and/or the second torsional fuse portion 54 upon rotating the first torsional fuse portion 52 or the second torsional fuse portion 54 relative to the other. Any feature, step, function, or structure described with regard to the embodiments of the system 10 are applied to the method described herein, and vice versa, in additional embodiments of the present disclosure.

Without in any way limiting the scope, interpretation, or application of the claims appearing below, it will be appreciated that the embodiments of the present disclosure provide the system 10 and the method for handling a threshold torque or elevated torque in the system 10. Once a threshold torque is reached or exceeded, relative rotation occurs to absorb torque between the first torsional fuse portion 52 and the second torsional fuse portion 54, which are otherwise press fit together from relative movement during normal operation. Torsional shocks, or elevated or extreme torque at or above the threshold torque, if received through the torsional fuse 50, instead of through other components of the system 10, may minimize or prevent damage and/or failure of such components or the system 10. Further, the torsional fuse 50 is configured as a resettable fuse in that, after receiving the threshold or elevated torque and operating as described in the embodiments herein, the torsional fuse 50 may continue to operate as intended to absorb or receive future threshold torque events with continued operation of the system 10. Further, the torsional fuse 50 may continue to operate in accordance with the threshold torque remaining consistent or at least substantially consistent due, at least in part, to the recesses 68 of various embodiments described herein. Finally, the system 10, the torsional fuse 50 of the system 10, and the method embodiments described herein provide the benefits described with reduced weight, space requirements, cost, and complexity as compared to conventional components or systems designed to absorb elevated torque levels such as, for example, a slip clutch or similar device.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An epicyclic gear system comprising:
a housing;
a shaft configured to rotate relative to the housing;
a sun gear being disposed concentric to the shaft;
a plurality of planet gears disposed around the sun gear;
a ring gear disposed around the plurality of planet gears;
a carrier connecting the plurality of planet gears; and
a torsional fuse defined by an interface between a first torsional fuse portion and a second torsional fuse portion, the torsional fuse being configured to allow rotation between the first torsional fuse portion and the second torsional fuse portion upon application of a threshold torque at the torsional fuse;
wherein the first torsional fuse portion includes a first diameter and the second torsional fuse portion includes a second diameter such that the first torsional fuse portion is press fit with the second torsional fuse portion due to a difference between the first diameter and the second diameter.

2. The epicyclic gear system of claim 1, wherein the first torsional fuse portion is fixed to the shaft and the second torsional fuse portion is fixed to the ring gear.

3. The epicyclic gear system of claim 2, wherein the first torsional fuse portion includes a radially extending member such that the torsional fuse is disposed between the radially extending member and the ring gear.

4. The epicyclic gear system of claim 2, wherein the second torsional fuse portion includes a radially extending member such that the torsional fuse is disposed between the radially extending member and the shaft.

5. The epicyclic gear system of claim 1, wherein the first torsional fuse portion is fixed to the ring gear and the second torsional fuse portion is fixed to the housing.

6. The epicyclic gear system of claim 1, wherein the first torsional fuse portion is fixed to the sun gear and the second torsional fuse portion is fixed to a second shaft fixed to the housing.

7. The epicyclic gear system of claim 1, wherein the interface includes a plurality of recesses extending axially in at least one of the first torsional fuse portion and the second torsional fuse portion.

8. The epicyclic gear system of claim 1 wherein the threshold torque is correlated to the difference between the first diameter and the second diameter.

9. The epicyclic gear system of claim 1, further comprising a retainer configured to limit axial movement between the first torsional fuse portion and the second torsional fuse portion.

10. An epicyclic gear system comprising:
a housing;
a shaft configured to rotate relative to the housing;
a sun gear being disposed concentric to the shaft;
a plurality of planet gears disposed around the sun gear;
a ring gear disposed around the plurality of planet gears;
a carrier connecting the plurality of planet gears; and
a torsional fuse defined by an interface between a first torsional fuse portion and a second torsional fuse portion, the torsional fuse being configured to allow rotation between the first torsional fuse portion and the second torsional fuse portion upon application of a threshold torque at the torsional fuse;
wherein the first torsional fuse portion is fixed to the shaft and the second torsional fuse portion is fixed to the ring gear.

11. The epicyclic gear system of claim 10, wherein the first torsional fuse portion includes a radially extending member such that the torsional fuse is disposed between the radially extending member and the ring gear.

12. The epicyclic gear system of claim 10, wherein the second torsional fuse portion includes a radially extending member such that the torsional fuse is disposed between the radially extending member and the shaft.

13. The epicyclic gear system of claim 10, wherein the interface includes a plurality of recesses extending axially in at least one of the first torsional fuse portion and the second torsional fuse portion.

14. The epicyclic gear system of claim 10, wherein the first torsional fuse portion includes a first diameter and the second torsional fuse portion includes a second diameter such that the first torsional fuse portion is press fit with the second torsional fuse portion due to a difference between the first diameter and the second diameter.

15. The epicyclic gear system of claim 14, wherein the threshold torque is correlated to the difference between the first diameter and the second diameter.

16. The epicyclic gear system of claim 10, further comprising a retainer configured to limit axial movement between the first torsional fuse portion and the second torsional fuse portion.

17. An epicyclic gear system comprising:
a housing;
a shaft configured to rotate relative to the housing;
a sun gear being disposed concentric to the shaft;
a plurality of planet gears disposed around the sun gear;
a ring gear disposed around the plurality of planet gears;
a carrier connecting the plurality of planet gears; and
a torsional fuse defined by an interface between a first torsional fuse portion and a second torsional fuse portion, the torsional fuse being configured to allow rotation between the first torsional fuse portion and the second torsional fuse portion upon application of a threshold torque at the torsional fuse;
wherein the interface includes a plurality of recesses extending axially in at least one of the first torsional fuse portion and the second torsional fuse portion.

18. The epicyclic gear system of claim 17, wherein the first torsional fuse portion is fixed to the shaft and the second torsional fuse portion is fixed to the ring gear.

19. The epicyclic gear system of claim 18, wherein the first torsional fuse portion includes a radially extending member such that the torsional fuse is disposed between the radially extending member and the ring gear.

20. The epicyclic gear system of claim 18, wherein the second torsional fuse portion includes a radially extending member such that the torsional fuse is disposed between the radially extending member and the shaft.

21. The epicyclic gear system of claim 17, wherein the first torsional fuse portion is fixed to the ring gear and the second torsional fuse portion is fixed to the housing.

22. The epicyclic gear system of claim 17, wherein the first torsional fuse portion is fixed to the sun gear and the second torsional fuse portion is fixed to a second shaft fixed to the housing.

23. The epicyclic gear system of claim 17, wherein the first torsional fuse portion includes a first diameter and the second torsional fuse portion includes a second diameter such that the first torsional fuse portion is press fit with the second torsional fuse portion due to a difference between the first diameter and the second diameter.

24. The epicyclic gear system of claim 23, wherein the threshold torque is correlated to the difference between the first diameter and the second diameter.

25. The epicyclic gear system of claim 17, further comprising a retainer configured to limit axial movement between the first torsional fuse portion and the second torsional fuse portion.

* * * * *